US011777338B2

United States Patent
Peramsetty et al.

(10) Patent No.: US 11,777,338 B2
(45) Date of Patent: Oct. 3, 2023

(54) AC SWITCH PFC WITH INTEGRATED CHARGER AND DC-DC FOR ONLINE UPS SYSTEMS

(71) Applicant: SCHNEIDER ELECTRIC IT CORPORATION, Foxboro, MA (US)

(72) Inventors: Sreenadh Peramsetty, Vedayapalem (IN); Pavan Kumar Gudipalli, Karnataka (IN)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 0 days.

(21) Appl. No.: 17/662,701

(22) Filed: May 10, 2022

(65) Prior Publication Data
US 2022/0399751 A1    Dec. 15, 2022

(30) Foreign Application Priority Data
Jun. 15, 2021    (IN) .............................. 202111026535

(51) Int. Cl.
*H02J 9/06*    (2006.01)
(52) U.S. Cl.
CPC .............. *H02J 9/068* (2020.01); *H02J 9/061* (2013.01); *H02J 9/062* (2013.01)
(58) Field of Classification Search
CPC ............ H02J 9/068; H02J 9/061; H02J 9/062; H02M 1/10; H02M 3/1582
USPC .......................................................... 307/66
See application file for complete search history.

(56) References Cited

U.S. PATENT DOCUMENTS

| | | | |
|---|---|---|---|
| 7,141,892 B2 | 11/2006 | Dai et al. | |
| 8,884,464 B2 | 11/2014 | Jayaraman et al. | |
| 9,595,876 B2 | 3/2017 | Nielsen | |
| 2013/0027126 A1* | 1/2013 | Jayaraman | H02M 3/158 327/547 |
| 2013/0049699 A1 | 2/2013 | Jayaraman et al. | |

(Continued)

FOREIGN PATENT DOCUMENTS

| | | |
|---|---|---|
| EP | 2903125 A1 | 8/2015 |
| EP | 3661008 A1 | 6/2020 |

(Continued)

OTHER PUBLICATIONS

Extended European Search Report from corresponding European Patent Application No. 22172913.0 dated Nov. 9, 2022.

*Primary Examiner* — Richard Tan
(74) *Attorney, Agent, or Firm* — Lando & Anastasi, LLP

(57) ABSTRACT

An Uninterruptible Power Supply (UPS) including an input configured to receive input AC power having an input AC voltage, a backup power input configured to be coupled to a backup power source and to provide DC power to the backup power source for charging, a positive DC bus and a negative DC bus, the positive and negative DC busses being galvanically coupled to the backup power input, and a converter coupled to the input, the backup power input, and the positive and negative DC busses, the converter including a first inductor, a second inductor, a first converter switch configured to couple the first inductor to a neutral connection, a second converter switch configured to couple the second inductor to the positive DC bus, and a third converter switch configured to couple the second inductor to the negative DC bus, wherein the UPS is voltage-frequency independent.

28 Claims, 9 Drawing Sheets

(56) References Cited

U.S. PATENT DOCUMENTS

2017/0104365 A1  4/2017  Ghosh et al.
2022/0399745 A1  12/2022  Nagabhushanrao et al.

FOREIGN PATENT DOCUMENTS

| EP | 4106142 A1 | 12/2022 |
| FR | 3076123 A1 | 6/2019 |
| IN | 202011004302 | 8/2021 |

* cited by examiner

AC SWITCH PFC WITH INTEGRATED CHARGER AND DC-DC FOR ONLINE UPS SYSTEMS

CROSS-REFERENCE TO RELATED APPLICATIONS

This application claims priority under 35 U.S.C. § 119 to Indian Application Serial No. 202111026535 titled "AC SWITCH PFC WITH INTEGRATED CHARGER AND DC-DC FOR ONLINE UPS SYSTEMS," filed on Jun. 15, 2021, which is hereby incorporated by reference in its entirety.

BACKGROUND

1. Field of Invention

Embodiments of this disclosure relate generally to power conversion, and more particularly, to AC-DC power conversion in an uninterruptible power supply.

2. Discussion of Related Art

An uninterruptible power supply (UPS) is used to provide backup power to an electrical device, or load, when the primary power source, or mains, fails. Typical loads include computer systems, but other loads, such as heating/cooling/ventilation systems, lighting systems, network switches and routers, and security data center management systems may also receive backup power between 1 and 20 kVA for several hours.

SUMMARY

At least one aspect of the present disclosure is directed to an Uninterruptible Power Supply (UPS). The UPS includes an input configured to receive input AC power having an input AC voltage, a backup power input configured to be coupled to a backup power source and to provide DC power to the backup power source for charging, a positive DC bus and a negative DC bus, the positive and negative DC busses being galvanically coupled to the backup power input, and a converter coupled to the input, the backup power input, and the positive and negative DC busses, the converter including a first inductor, a second inductor, a first converter switch configured to couple the first inductor to a neutral connection, a second converter switch configured to couple the second inductor to the positive DC bus, and a third converter switch configured to couple the second inductor to the negative DC bus, wherein the UPS is voltage-frequency independent.

In one embodiment, the UPS includes a controller coupled the converter and configured to: operate, in a first mode of operation and during a positive half-cycle of the input AC voltage, the first converter switch to provide DC power derived from the input AC power to the positive DC bus via the first inductor and at least one of the second converter switch or the third converter switch to provide DC power derived from at least one of the positive DC bus or the negative DC bus to the backup power input via the second inductor, and operate, in the first mode of operation and during a negative half-cycle of the input AC voltage, the first converter switch to provide DC power derived from the input AC power to the negative DC bus via the first inductor and at least one of the second converter switch or the third converter switch to provide DC power derived from at least one of the positive DC bus or the negative DC bus to the backup power input via the second inductor. In some embodiments, the UPS includes an input selection circuit configured to couple the converter to the input during the first mode of operation and to the backup power input during the second mode of operation. In various embodiments, the controller is configured to monitor the input AC power, operate, in response to a determination that the input AC power is acceptable, the UPS in the first mode of operation, and operate, in response to a determination that the input AC power is unacceptable, the UPS in a second mode of operation. In certain embodiments, the backup power input is configured to receive backup DC power from the backup power source and the converter further includes a fourth converter switch configured to couple the second inductor to the backup power input.

In some embodiments, the controller is configured to: operate, in the second mode of operation, the first converter switch to provide DC power derived from the backup DC power to the positive DC bus via the first inductor, and operate, in the second mode of operation, the fourth converter switch to provide DC power derived from the backup DC power to the negative DC bus via the second inductor. In one embodiment, the converter further includes a fifth converter switch configured to couple the second inductor to the neutral connection and the controller is configured to: operate, in the second mode of operation, the fifth converter switch to provide DC power derived from the backup DC power to the positive DC bus via the second inductor, and operate, in the second mode of operation, the fourth converter switch to provide DC power derived from the backup DC power to the negative DC bus via the second inductor. In one embodiment, the first converter switch is a bidirectional switch circuit including a first switch and a second switch coupled in series. In certain embodiments, the converter includes a first diode coupled between the first converter switch and the positive DC bus, a second diode coupled between the first converter switch and the negative DC bus, a fourth converter switch configured to couple the second inductor to the backup power input, and a fifth converter switch configured to couple the second inductor to the neutral connection. In various embodiments, the first inductor, the first switch of the first converter switch, a body diode of the second switch of the first converter switch, and the first diode are configured to operate as a boost converter during a positive half-cycle of the input AC voltage in the first mode of operation to provide DC power derived from the input AC power to the positive DC bus.

In some embodiments, the second inductor, the third converter switch, and a body diode of the fourth converter switch are configured to operate as a buck-boost converter in the first mode of operation to provide DC power derived from the negative DC bus to the backup power input. In one embodiment, the first inductor, the second switch of the first converter switch, a body diode of the first switch of the first converter switch, and the second diode are configured to operate as a boost converter during a negative half-cycle of the input AC voltage in the first mode of operation to provide DC power derived from the input AC power to the negative DC bus. In various embodiments, the second inductor, the second converter switch, and a body diode of the fifth converter switch are configured to operate as a buck converter in the first mode of operation to provide DC power derived from the positive DC bus to the backup power input. In certain embodiments, the first inductor, the first switch of the first converter switch, a body diode of the second switch of the first converter switch, and the first diode are configured to operate as a boost converter in the second mode of operation to provide DC power derived from the backup DC power to the positive DC bus.

In one embodiment, the second inductor, the fourth converter switch, a body diode of the second converter switch, and the fifth converter switch are configured to operate as a boost converter in the second mode of operation to provide DC power derived from the backup DC power to the positive DC bus. In some embodiments, the second inductor, the fourth converter switch, a body diode of the third converter switch, and the fifth converter switch are configured to operate as a buck-boost converter during the second mode of operation to provide DC power derived from the backup DC power to the negative DC bus. In various embodiments, the UPS includes an output configured to provide output AC power to a load, and an inverter coupled to the output and configured to convert DC power from the positive and negative DC busses into the output AC power and provide the output AC power to the output.

Another aspect of the present disclosure is directed to a non-transitory computer-readable medium storing thereon sequences of computer-executable instructions for controlling an Uninterruptible Power Supply (UPS) including an input configured to receive input AC power having an input AC voltage, a backup power input configured to be coupled to a backup power source and to provide DC power to the backup power source for charging, a positive DC bus, a negative DC bus, a converter coupled to the input, the backup power input, and the positive and negative DC busses, the converter including a first inductor, a second inductor, a first converter switch configured to couple the first inductor to a neutral connection, a second converter switch configured to couple the second inductor to the positive DC bus, and a third converter switch configured to couple the second inductor to the negative DC bus. The sequences of computer-executable instructions including instructions that instruct at least one processor to: operate, in a first mode of operation and during a positive half-cycle of the input AC voltage, the first converter switch to provide DC power derived from the input AC power to the positive DC bus via the first inductor and at least one of the second converter switch or the third converter switch to provide DC power derived from at least one of the positive DC bus or the negative DC bus to the backup power input via the second inductor, and operate, in the first mode of operation and during a negative half-cycle of the input AC voltage, the first converter switch to provide DC power derived from the input AC power to the negative DC bus via the first inductor and at least one of the second converter switch or the third converter switch to provide DC power derived from at least one of the positive DC bus or the negative DC bus to the backup power input via the second inductor.

In one embodiment, the sequences of instructions include instructions that cause the at least one processor to monitor the input AC power received at the input, operate, in response to a determination that the input AC power is acceptable, the UPS in the first mode of operation, and operate, in response to a determination that the input AC power is unacceptable, the UPS in a second mode of operation. In some embodiments, the UPS includes an input selection circuit and the sequences of instructions include instructions that cause the at least one processor to: control the input selection circuit to couple the converter to the input during the first mode of operation, and control the input selection circuit to couple the converter to the backup power input during the second mode of operation. In various embodiments, the backup power input is further configured to receive backup DC power from the backup power source and the converter includes a fourth converter switch configured to couple the second inductor to the backup power input. In certain embodiments, the sequences of instructions include instructions that cause the at least one processor to: operate, in the second mode of operation, the first converter switch to provide DC power derived from the backup DC power to the positive DC bus via the first inductor, and operate, in the second mode of operation, the fourth converter switch to provide DC power derived from the backup DC power to the negative DC bus via the second inductor.

In some embodiments, the converter includes a fifth converter switch configured to couple the second inductor to the neutral connection and the sequences of instructions include instructions that cause the at least one processor to: operate, in the second mode of operation, the fifth converter switch to provide DC power derived from the backup DC power to the positive DC bus via the second inductor, and operate, in the second mode of operation, the fourth converter switch to provide DC power derived from the backup DC power to the negative DC bus via the second inductor.

Another aspect of the present disclosure is directed to a method of assembling an Uninterruptible Power Supply (UPS) including providing an input configured to receive input AC power having an input AC voltage, providing a backup power input configured to be coupled to a backup power source and to provide DC power to the backup power source for charging, galvanically coupling a positive DC bus and a negative DC bus to the backup power input, and coupling a converter to the input, the backup power input, and the positive and negative DC busses, the converter including a first inductor, a second inductor, a first converter switch configured to couple the first inductor to a neutral connection, a second converter switch configured to couple the second inductor to the positive DC bus, and a third converter switch configured to couple the second inductor to the negative DC bus, wherein the UPS is voltage-frequency independent.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Figure 1:
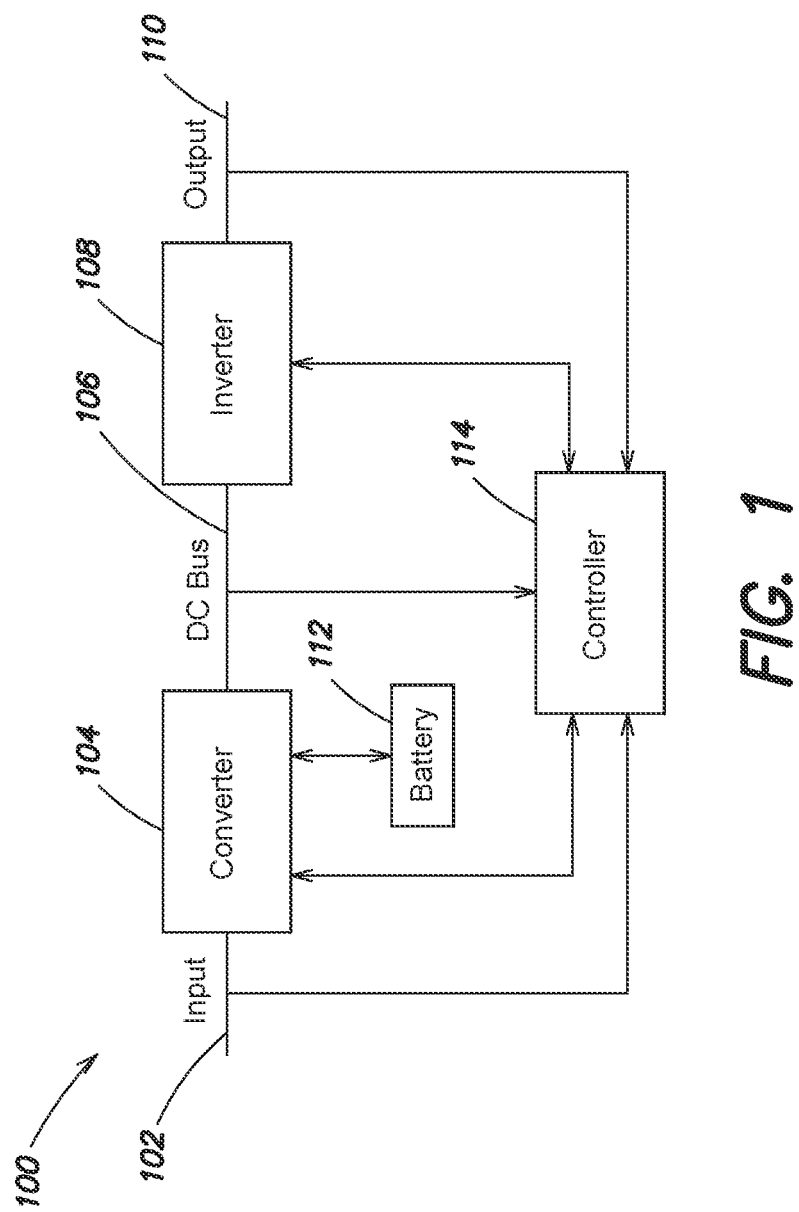
FIG. 1 is a functional block diagram of a UPS in accordance with aspects described herein.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

As discussed above, power devices, such as uninterruptible power supplies (UPS), may be used to provide regulated, uninterrupted power to sensitive and/or critical loads. An online UPS rectifies input AC power provided by an electric utility using a Power Factor Correction converter (PFC) circuit to provide DC power to at least one DC bus. The rectified DC power on the DC bus(es) may be used to charge a battery while mains power is available. In the absence of mains power, the battery discharges and provides DC power to the DC bus(es). From the DC power on the DC bus(es), an inverter generates an AC output voltage that is provided to a load. Since power is provided to the DC bus(es) from either mains or the battery, the output power of the UPS is uninterrupted if the mains fails and the battery is sufficiently charged. Online UPS's may also operate in a bypass mode where unconditioned power with basic protection is provided directly from an AC power source to a load via a bypass line.

In many cases, the front-end topology of an online UPS includes a PFC converter to provide DC power to the DC bus when AC mains is available and a separate DC/DC converter to provide DC power to the DC bus from the battery when AC mains is unavailable. In some cases, the front-end topology may include a separate charger (i.e., DC/DC converter) configured to charge the battery. As such, these front-end UPS topologies often have a high component count which can result in increased cost, increased system complexity, and reduced power density. In addition, such front-end UPS topologies often include components which are unused or idle during at least one mode of operation of the UPS.

A more cost effective and compact front-end topology for an online UPS is provided herein. In at least one embodiment, the front-end topology includes an integrated converter configured to operate as a PFC converter, a DC/DC converter, and a battery charger. In one example, the integrated converter is configured to provide power to the positive and negative DC busses while using power from the positive and negative DC busses to charge the battery. In some examples, the improved front-end topology may have a reduced component count, increasing the power density of the UPS and reducing cost.

FIG. 1 is a block diagram of one embodiment of an online UPS 100 that can provide regulated power from input AC power received at an input 102, as well as back-up DC power from a backup power source 112 (e.g., a battery), to an output 110. The UPS 100 can be configured to provide output AC power that is voltage and frequency independent from the input AC power. In some examples, the backup power source 112 may be included in the UPS 100; however, in other examples, the backup power source 112 may be external to the UPS 100. The UPS 100 includes a converter 104, a DC bus 106, an inverter 108, and a controller 114 for controlling the converter 104 and the inverter 108. The DC bus 106 is coupled between the converter 104 and the inverter 108.

The input 102 is configured to receive input AC power having an input voltage level from an AC power source. The controller 114 monitors the input AC power received by the input 102 and is configured to operate the UPS 100 in different modes of operation based on the status of the input AC power received by the input 102. When AC power provided to the input 102 is acceptable (i.e., above an input power quality threshold), the controller 114 operates the UPS 100 in an online mode of operation.

In the online mode of operation, AC power from the input 102 is provided to the converter 104. The controller 114 operates the converter 104 to convert the AC power into DC power and provide the DC power to the DC bus 106. DC power from the DC bus 106 is provided to the inverter 108. In addition, DC power from the DC bus 106 may be provided to the battery 112 for charging, either directly from the converter 104 or via a separate DC/DC converter (e.g., a charger). The controller 114 operates the inverter 108 to convert the DC power into regulated AC power and provide the regulated AC power to a load coupled to the output 110.

When AC power provided to the input 102 is not acceptable (i.e., below an input power quality threshold), the controller 114 operates the UPS 100 in a backup mode of operation. In the backup mode of operation, DC power from the backup power source 112 is provided to the DC bus 106. The inverter 108 receives the DC power from the DC bus 106, and the controller 114 operates the inverter 108 to convert the DC power from the DC bus 106 into regulated AC power and provide the regulated AC power to the output 110.

As discussed above, many online UPS topologies employ separate DC/DC converters for converting the input AC power and the backup DC power. For example, in such topologies, the converter 104 may include a PFC converter configured to provide DC power to the DC bus 106 derived from the input AC power during the online mode of operation and a separate DC/DC converter configured to provide DC power to the DC bus 106 derived from the backup DC power during the backup mode of operation. In some examples, the DC/DC converter may be configured to charge the battery 112 from the DC bus; however, in other examples, the converter 104 (or the UPS 100) may include a separate charger (i.e., DC/DC converter) to charge the battery 112.

While such topologies can be utilized to provide uninterrupted power, the use of multiple converters requires the use of additional components. For example, the charger may include extra components such as switches, diodes, inductors, transformers (e.g. step-down transformers), etc. in order to provide DC power to the battery for charging derived from the input AC power or the DC bus. As such, these multiple converter topologies can increase cost and complexity while reducing the power density of the UPS.

In addition, in certain environments (e.g., developing economies), frequent and long lasting power outages may drive a need for large (or high powered) battery packs. In such cases, the charger included in converter 104 (or the UPS 100) may be configured as a high-powered charger. In other examples, the charger may be configured as a high-powered charger to support specific types of batteries (e.g., Lithium) and/or to provide specific features (e.g., fast charging). In some examples, configuring the charger as a high-power converter can further increase the size and cost of the UPS 100.

As such, it may be advantageous to configure the front-end topology of the UPS 100 (e.g., the converter 104) as an integrated converter capable of providing DC power to the DC bus 106 derived from either the input AC power or the backup DC power and charging the battery 112 using DC power derived from the DC bus 106.

Figure 2:
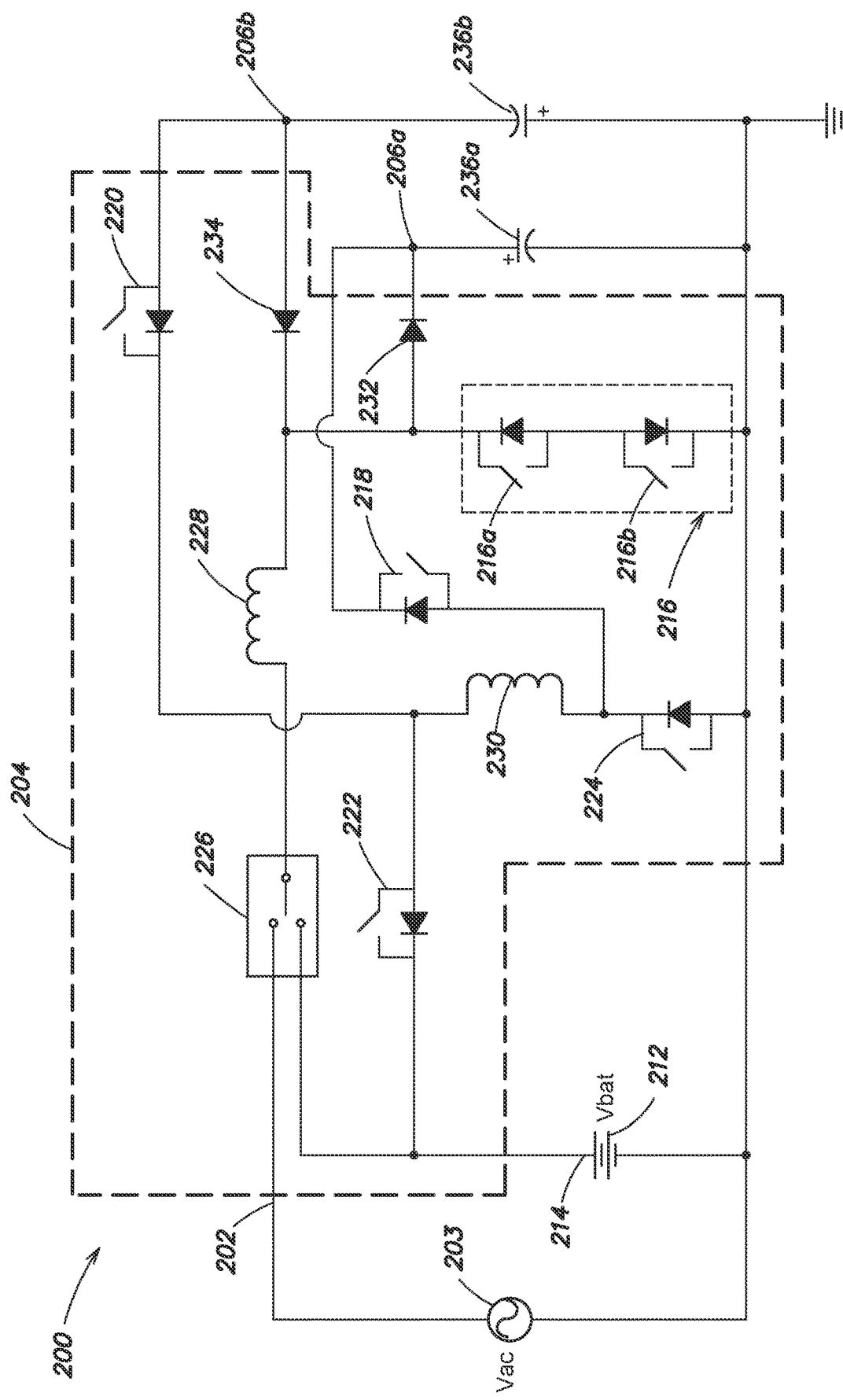
FIG. 2 is a schematic diagram of a UPS front-end topology in accordance with aspects described herein.

FIG. 2 is a schematic diagram of a front-end topology 200 according to aspects described herein. In one example, the front-end topology 200 is configured to be included in an online UPS (i.e., a voltage-frequency independent UPS). For example, the front-end topology 200 includes a converter 204 and a DC bus 206 corresponding to the converter 104 and the DC bus 106 of the UPS 100 of FIG. 1, respectively. In some examples, the DC bus 206 includes a positive DC bus 206a and a negative DC bus 206b.

As shown, the front-end topology 200 includes an input 202 coupled to an input AC source 203 and a backup power input 214 coupled to a backup power source 212 (e.g., a battery). In certain examples, the backup power source 212 may be included in the UPS; however, in other examples, the backup power source 212 may be separate from the UPS. In some examples, the front-end topology 200 is configured with a pass-through neutral connection connected to the input 202 and the backup power source 212 to minimize EMI/EMC issues.

In one example, the converter 204 includes a first converter switch 216, a second converter switch 218, a third converter switch 220, a fourth converter switch 222, and a fifth converter switch 224, an input selection circuit 226, a first inductor 228, a second inductor 230, a first diode 232, and a second diode 234. In one embodiment, the converter switches 216-224 are Metal-Oxide-Semiconductor Field-Effect Transistors (MOSFETs); however, in other embodiments, different types of switches or transistors can be utilized (e.g., Insulated-Gate Bipolar Transistors (IGBTs)). In some examples, each switch has a gate, a drain, and a source. In this context, "drain" may refer to any device terminal at which current enters the switch. Likewise, "source" may refer to any device terminal at which current exits the switch.

In some examples, the first converter switch 216 is a bidirectional switch circuit including a first switch 216a coupled in series with a second switch 216b. As such, the first converter switch 216 can be operated in a first state by turning on (i.e., closing) the first switch 216a and turning off (i.e., opening) the second switch 216b to provide a conduction path through the first switch 216a and the body diode of the second switch 216b. Likewise, the first converter switch 216 can be operated in a second state by turning on (i.e., closing) the second switch 216b and turning off (i.e., opening) the first switch 216a to provide a conduction path through the second switch 216b and the body diode of the first switch 216a.

As shown, the input selection circuit 226 is configured to couple the first inductor 228 to one of the input 202 or the backup power input 214. In one example, a first end of the first inductor 228 is coupled to the first converter switch 216, an anode of the first diode 232, and a cathode of the second diode 234, and a second end of the first inductor 228 is coupled to the input selection circuit 226. The cathode of the first diode 232 is coupled to the positive DC bus 206a and the anode of the second diode 234 is coupled to the negative DC bus 206b. In some examples, a first end of the second inductor 230 is coupled to first converter switch 218 and the fifth converter switch 224, and a second end of the second inductor 230 is coupled to the third converter switch 220 and the fourth converter switch 222. The second converter switch 218 is coupled between the first end of the second inductor 230 and the positive DC bus 206a and the fifth converter switch 224 is coupled between the first end of the second inductor 230 and neutral. The third converter switch 220 is coupled between the second end of the second inductor 230 and the negative DC bus 206b and the fourth converter switch 222 is coupled between the second end of the second inductor 230 and the backup power input 214.

In one example, a positive DC bus capacitor 236a is coupled between the positive DC bus 206a and neutral and a negative DC bus capacitor 236b is coupled between the negative DC bus 206b and neutral. In some examples, the DC bus capacitors 236a, 236b are polarized capacitors. For example, the positive DC bus capacitor 236a may have a positive side coupled to the positive DC bus 206a and a negative side coupled to neutral. Likewise, the negative DC bus capacitor 236b may have a positive side coupled to neutral and a negative side coupled to the negative DC bus 206b. As shown in FIG. 2, the DC busses 206a, 206b are galvanically coupled to the backup power input 214.

In at least one example, the converter 204 of the front-end topology 200 can be operated in various modes of operation. For example, in the online mode of operation of the UPS, the input selection circuit 226 is controlled to couple the second end of the first inductor 228 to the input 202 such that AC power from the input 202 is provided to the converter 204. The converter 204 converts the AC power into DC power and provides the DC power to the DC busses 206a, 206b. In addition, during the online mode of operation, the converter 204 can be operated to provide DC power derived from the DC busses 206a, 206b to the backup power input 214 to charge the backup power source 212.

In some examples, the converter 204 is configured to operate as a bidirectional converter. The converter 204 may therefore be considered "bidirectional" inasmuch as the converter 204 may provide power to the backup power input 214 (i.e., the backup power source 212), and may also draw power from the backup power input 214. Conversely, certain unidirectional chargers may be configured to provide power to an energy-storage device or input, but may not draw power from the energy-storage device or input.

Figure 3A:
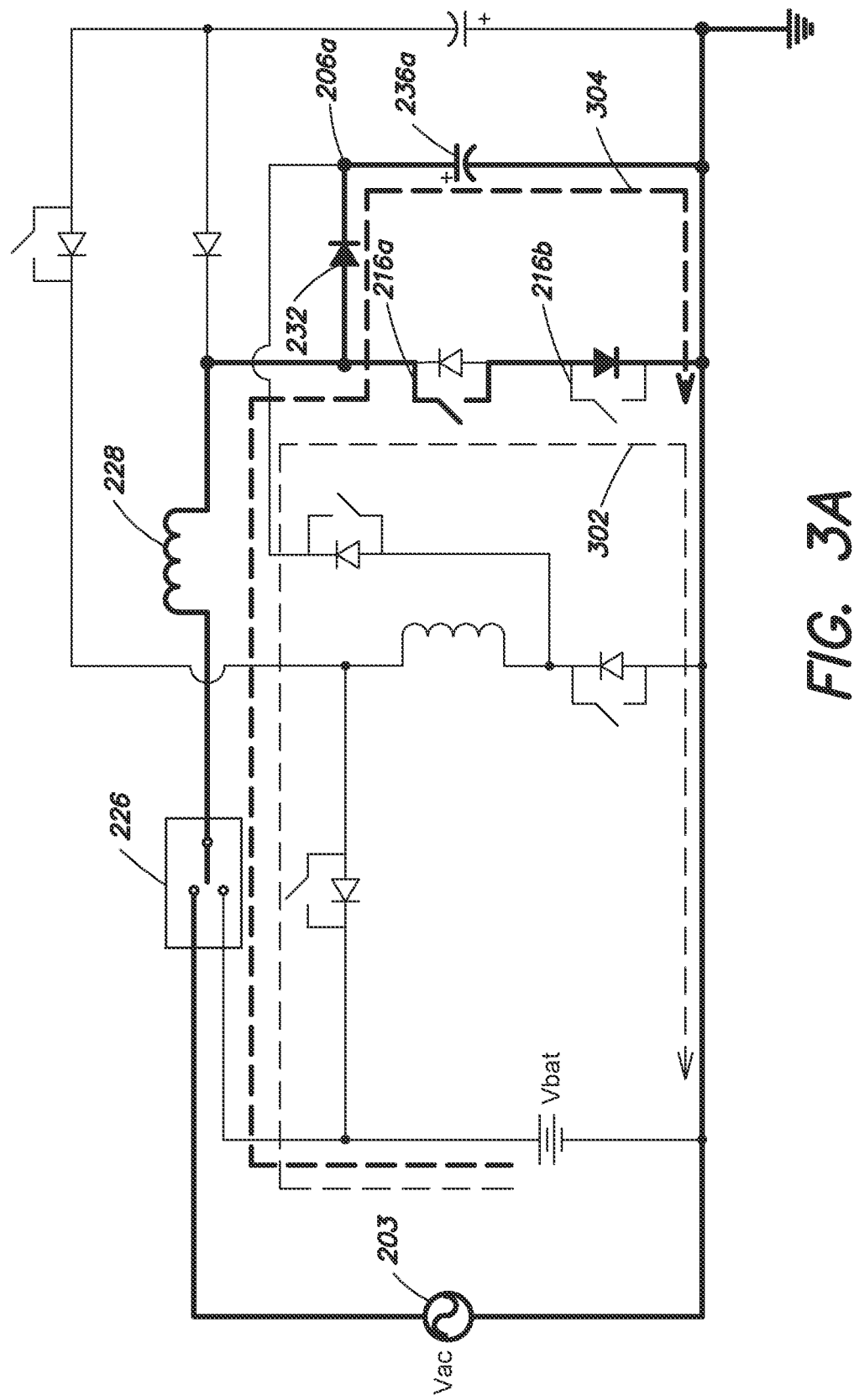
FIGS. 3A and 3B are schematic diagrams of the UPS front-end topology of FIG. 2, illustrating a PFC function during an online mode of operation in accordance with aspects described herein.
Figure 3B:
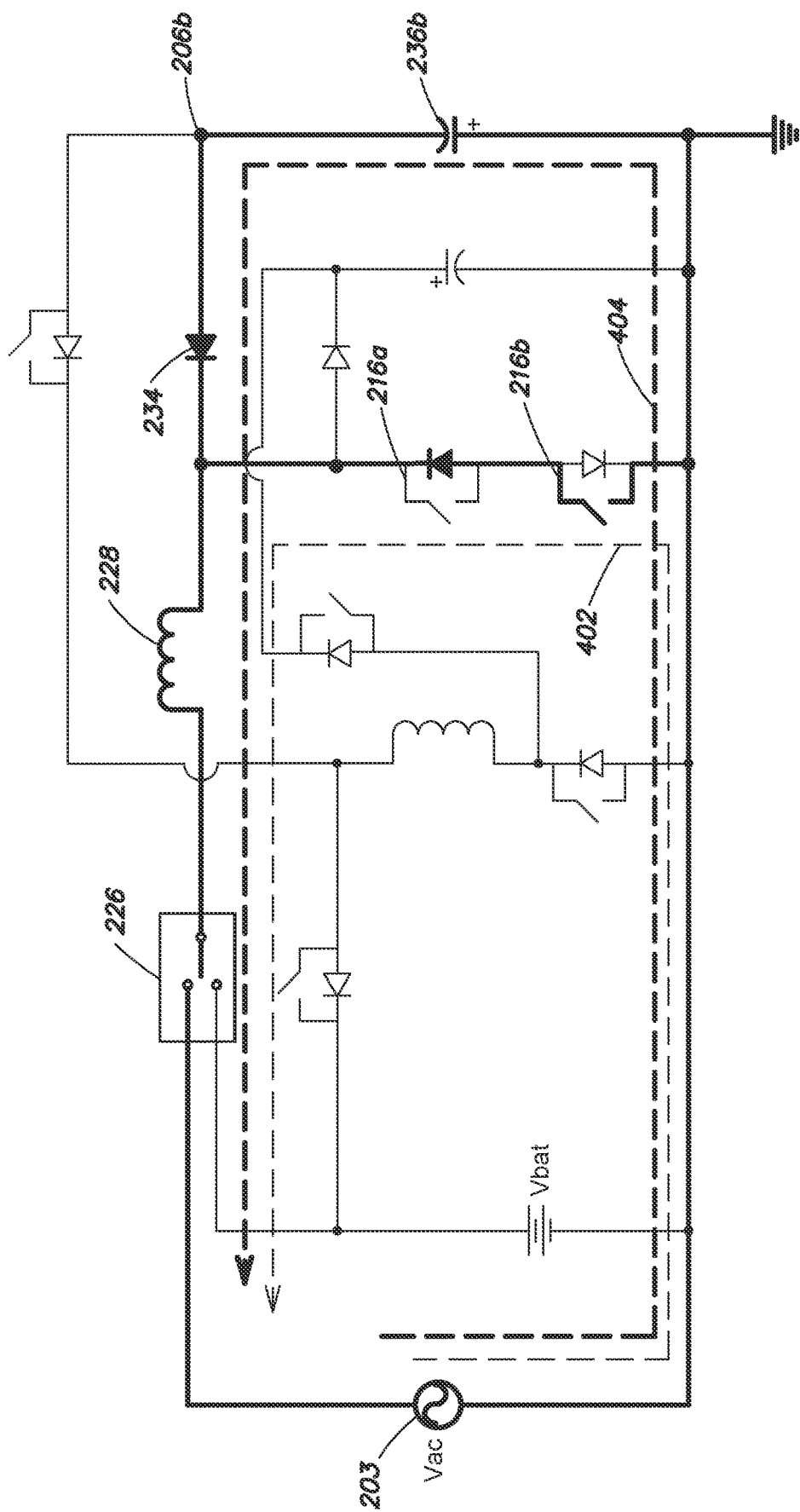

FIGS. 3A and 3B are schematic diagrams illustrating a PFC function of the converter 204 during the online mode of operation of the UPS and positive and negative half cycles of the input AC voltage corresponding to the input AC power.

As shown in FIG. 3A, during the online mode of operation and a positive half cycle of the input AC voltage, the first converter switch 216 is operated to provide DC power to the positive DC bus 206a derived from the input AC power (provided by the input AC source 203). In some examples, the first converter switch 216, the first inductor 228, and the first diode 232 are operated as a PFC boost converter to provide DC power to the positive DC bus 206a.

In one example of the online mode of operation during a positive half cycle of the input AC voltage, the first switch 216a of the first converter switch 216 is turned on and off to provide the PFC boost converter operation. For example, when the first switch 216a is turned on (i.e., closed), the first end of the first inductor 228 is coupled to neutral. As such, a conduction path 302 for the input AC power is provided through the first converter switch 216, energizing the inductor 228. In one example, the conduction path 302 includes the body diode of the second switch 216b of the first converter switch 216. Likewise, when the first switch 216a is turned off (i.e., opened), the first inductor 228 is decoupled from neutral. As such, a conduction path 304 for the input AC power is provided through the first inductor 228 and the first diode 232 to provide DC power to the positive DC bus 206a and charge the positive DC bus capacitor 236a.

As shown in FIG. 3B, during the online mode of operation and a negative half cycle of the input AC voltage, the first converter switch 216 is operated to provide DC power to the negative DC bus 206b derived from the input AC power (provided by the input AC source 203). In some examples, the first converter switch 216, the first inductor 228, and the second diode 234 are operated as a PFC boost converter to provide DC power to the negative DC bus 206b.

In one example of the online mode of operation during a negative half cycle of the input AC voltage, the second switch 216b of the first converter switch 216 is turned on and off to provide the PFC boost converter operation. For example, when the second switch 216b is turned on (i.e., closed), the first end of the first inductor 228 is coupled to neutral. As such, a conduction path 402 for the input AC power is provided through the first converter switch 216, energizing the first inductor 228. In one example, the conduction path 402 includes the body diode of the first switch 216a of the first converter switch 216. Likewise, when the second switch 216b is turned off (i.e., opened), the first inductor 228 is decoupled from neutral. As such, a conduction path 404 for the input AC power is provided through the first inductor 228 and the second diode 234 to provide DC power to the negative DC bus 206b and charge the negative DC bus capacitor 236b.

As described above, during the online mode of operation of the UPS, the converter 204 can be operated to provide DC power derived from the DC busses 206a, 206b to the backup power input 214 to charge the backup power source 212. In one example, in the online mode of operation, the converter 204 can charge the backup power source 212 using DC power derived from the positive DC bus 206a and/or the negative DC bus 206b during both the positive and negative half cycles of the input AC voltage.

Figure 4A:
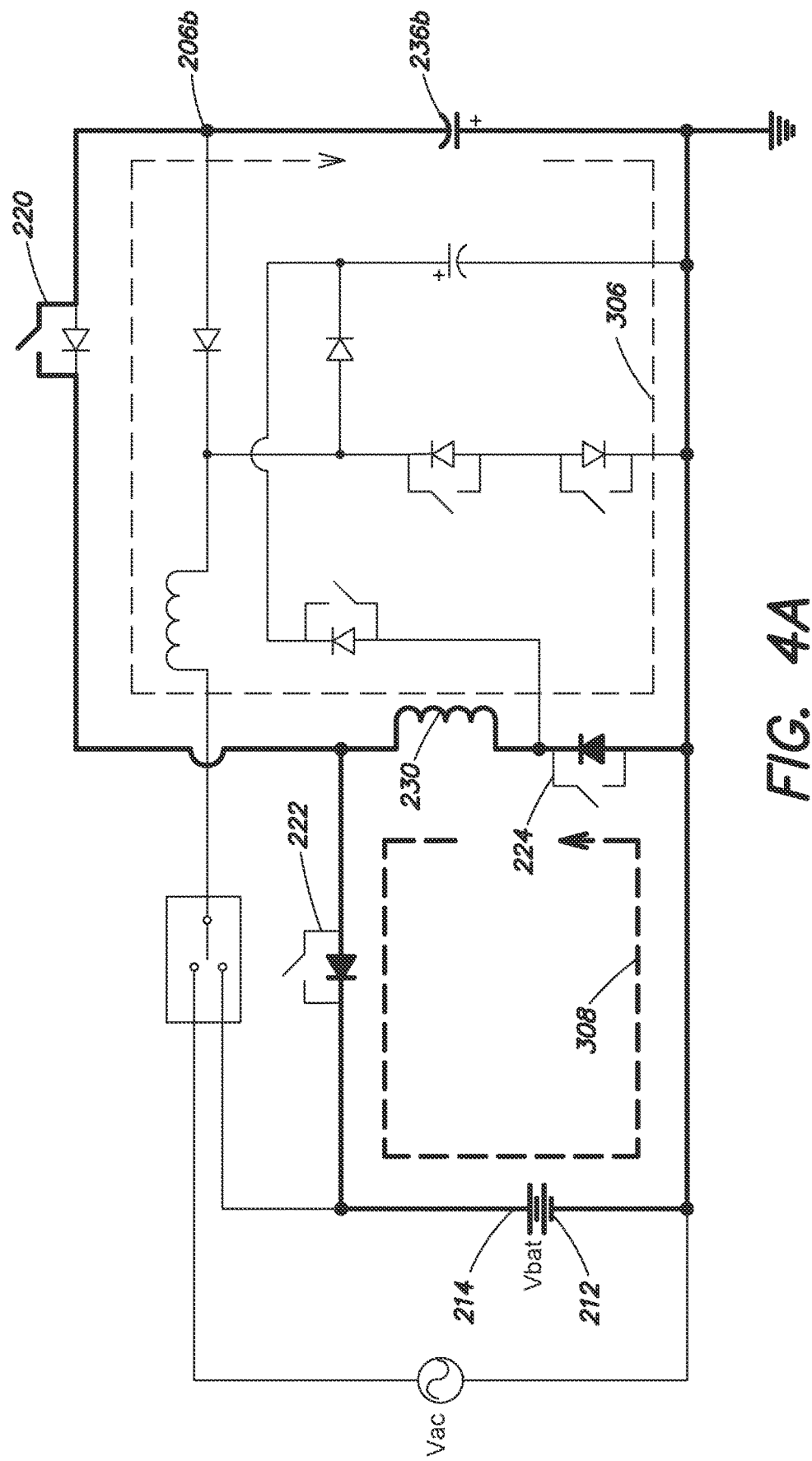
FIGS. 4A and 4B are schematic diagrams of the UPS front-end topology of FIG. 2, illustrating a charger function during an online mode of operation in accordance with aspects described herein.
Figure 4B:
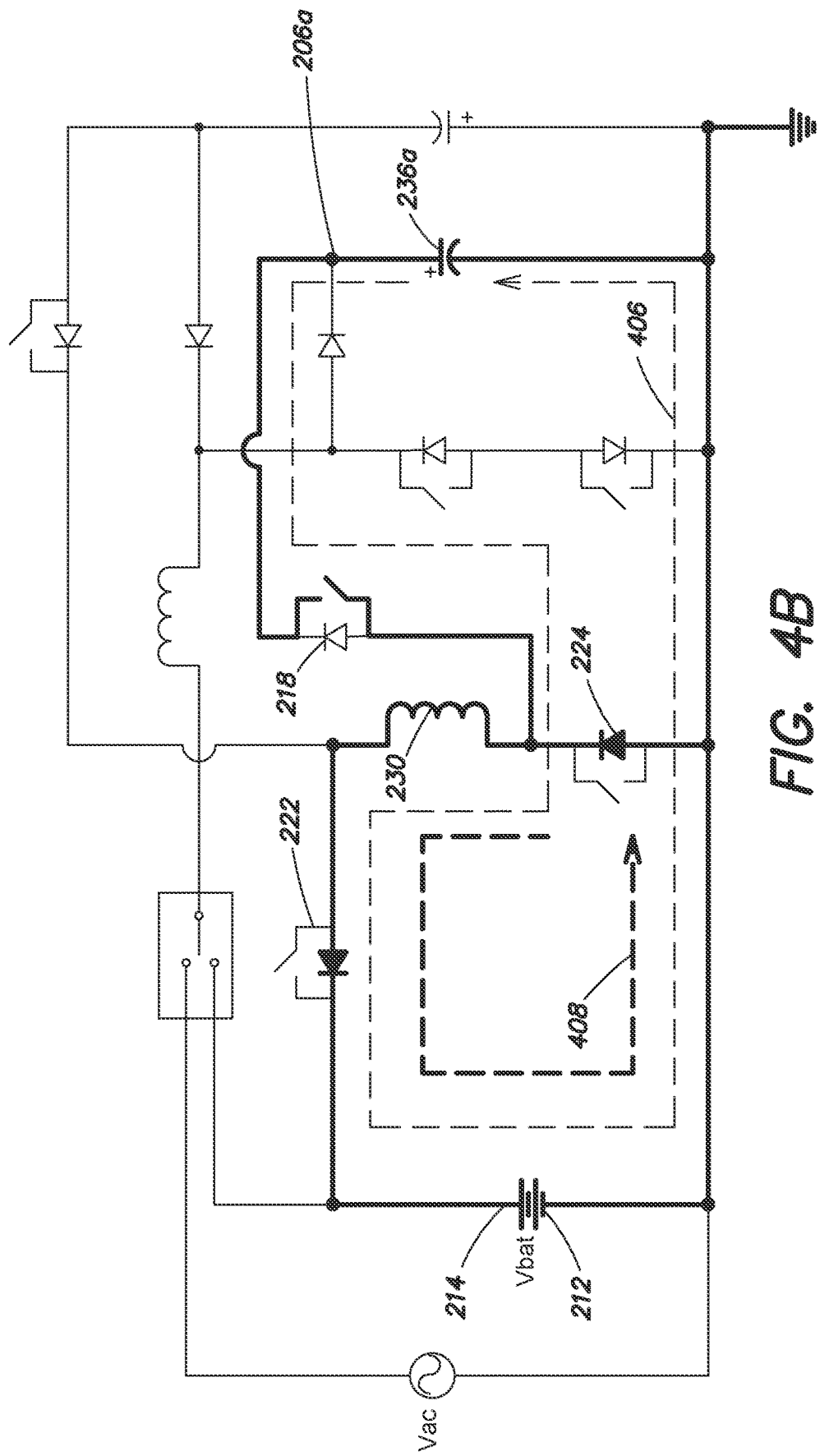

FIGS. 4A and 4B are schematic diagrams illustrating a charger function of the converter 204 during the online mode of operation of the UPS.

As shown in FIG. 4A, during the online mode of operation, the third converter switch 220 can be operated to provide DC power derived from the negative DC bus 206b (i.e., the negative DC bus capacitor 236b) to the backup power input 214 to charge the backup power source 212. In some examples, the third converter switch 220, the second inductor 230, and the body diode of the fourth converter switch 222 are operated as a buck-boost converter to provide DC power to the backup power input 214 derived from the negative DC bus 206b.

In one example, the third converter switch 220 is turned on and off to provide the buck-boost converter operation. For example, when the third converter switch 220 is turned on (i.e., closed), the second end of the second inductor 230 is coupled to the negative DC bus 206b. As such, a conduction path 306 for DC power stored by the negative DC bus capacitor 236b is provided though the third converter switch 220, energizing the second inductor 230. In one example, the conduction path 306 includes the body diode of the fifth converter switch 224; however, in some examples, the fifth converter switch 224 can be turned on (i.e., closed) to minimize losses. Likewise, when the third converter switch 220 is turned off (i.e., opened), the second inductor 230 is decoupled from the negative DC bus 236b. As such, a conduction path 308 is provided through the body diode of the fourth converter switch 222 and the body diode of the fifth converter switch 224 (or the fifth converter switch 224), allowing the second inductor 230 to de-energize and provide DC power to the backup power input 214 to charge the backup power source 212. In some examples, the DC power provided to the backup power input 214 may have a different voltage level (e.g., lower) than the voltage level of the negative DC bus 206b.

In one example, in the online mode of operation of the UPS, the converter 204 can be operated to provide DC power derived from the negative DC bus 206b to the backup power input 214 during both positive and negative half cycles of the input AC voltage. For example, the third converter switch 220 can be operated as described above while the converter 204 is providing power to the positive DC bus 206a (e.g., FIG. 3A) and to the negative DC bus 206b (e.g., FIG. 3B).

Similarly, as shown in FIG. 4B, during the online mode of operation, the second converter switch 218 can be operated to provide DC power derived from the positive DC bus 206a (i.e., the positive DC bus capacitor 236a) to the backup power input 214 to charge the backup power source 212. In some examples, the second converter switch 218, the second inductor 230, and the body diode of the fifth converter switch 224 are operated as a buck converter to provide DC power to the backup power input 214 derived from the positive DC bus 206a.

In one example, the second converter switch 218 is turned on and off to provide the buck converter operation. For example, when the second converter switch 218 is turned on (i.e., closed), the first end of the second inductor 230 is coupled to the positive DC bus 206a. As such, a conduction path 406 for DC power stored by the positive DC bus capacitor 236a is provided though the second converter switch 218, energizing the second inductor 230. In one example, the conduction path 406 includes the body diode of the fourth converter switch 222; however, in some examples, the fourth converter switch 222 can be turned on (i.e., closed) to minimize losses. Likewise, when the second converter switch 218 is turned off (i.e., opened), the second inductor 230 is decoupled from the positive DC bus 236a. As such, a conduction path 408 is provided through the body diode of the fourth converter switch 222 (or the fourth converter switch 222) and the body diode of the fifth converter switch 224, allowing the second inductor 230 to de-energize and provide DC power to the backup power input 214 to charge the backup power source 212. In some examples, the DC power provided to the backup power input 214 may have a different voltage level (e.g., lower) than the voltage level of the positive DC bus 206a.

In one example, in the online mode of operation of the UPS, the converter 204 can be operated to provide DC power derived from the positive DC bus 206a to the backup power input 214 during both positive and negative half cycles of the input AC voltage. For example, the second converter switch 218 can be operated as described above while the converter 204 is providing power to the positive DC bus 206a (e.g., FIG. 3A) and to the negative DC bus 206b (e.g., FIG. 3B).

In one example, the charging capacity of the converter 204 corresponds to the power demand at the output 110 of the UPS 100 (i.e., the output of the inverter 108). For example, when the UPS is not experiencing a full load at the output 110, the converter 204 may operate with a charging capacity up to 50% of the capacity of the inverter 108. As such, the charging capacity of the converter 204 can be scaled or adjusted based on the power demand at the output 110 of the UPS 100 (i.e., the load on the inverter 108). In some examples, the second inductor 230 can be resized (e.g., increased) to provide a different charging capacity (up to the full capacity of the inverter 108).

In the backup mode of operation, the input selection circuit 226 is controlled to couple the second end of the inductor 228 to the backup power input 214 such that backup DC power from the backup power source 212 is provided to the converter 204. The converter 204 converts the backup DC power into DC power and provides the DC power to the DC busses 206a, 206b.

Figure 5A:
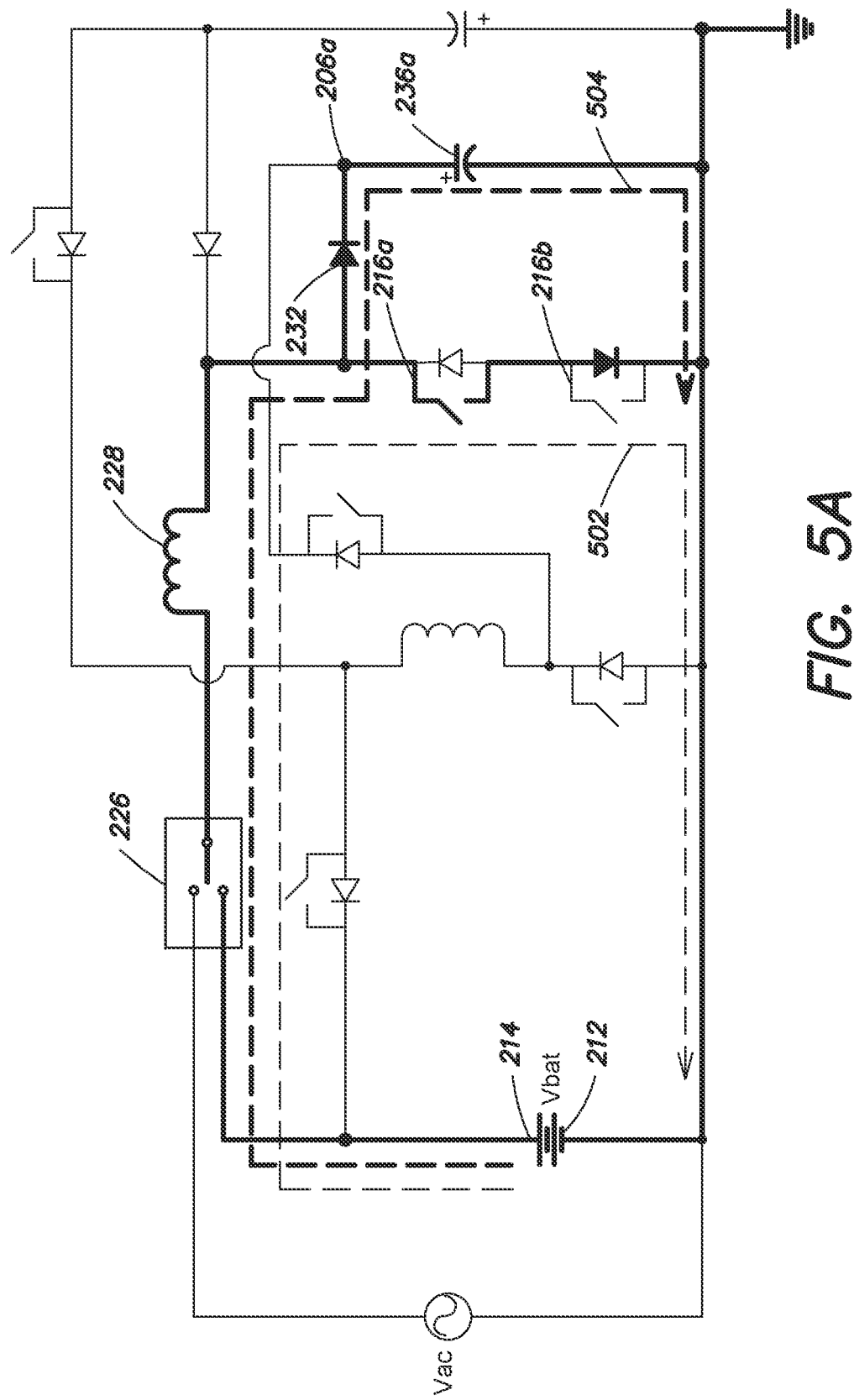
FIGS. 5A and 5B are schematic diagrams of the UPS front-end topology of FIG. 2, illustrating a backup mode of operation in accordance with aspects described herein.
Figure 5B:
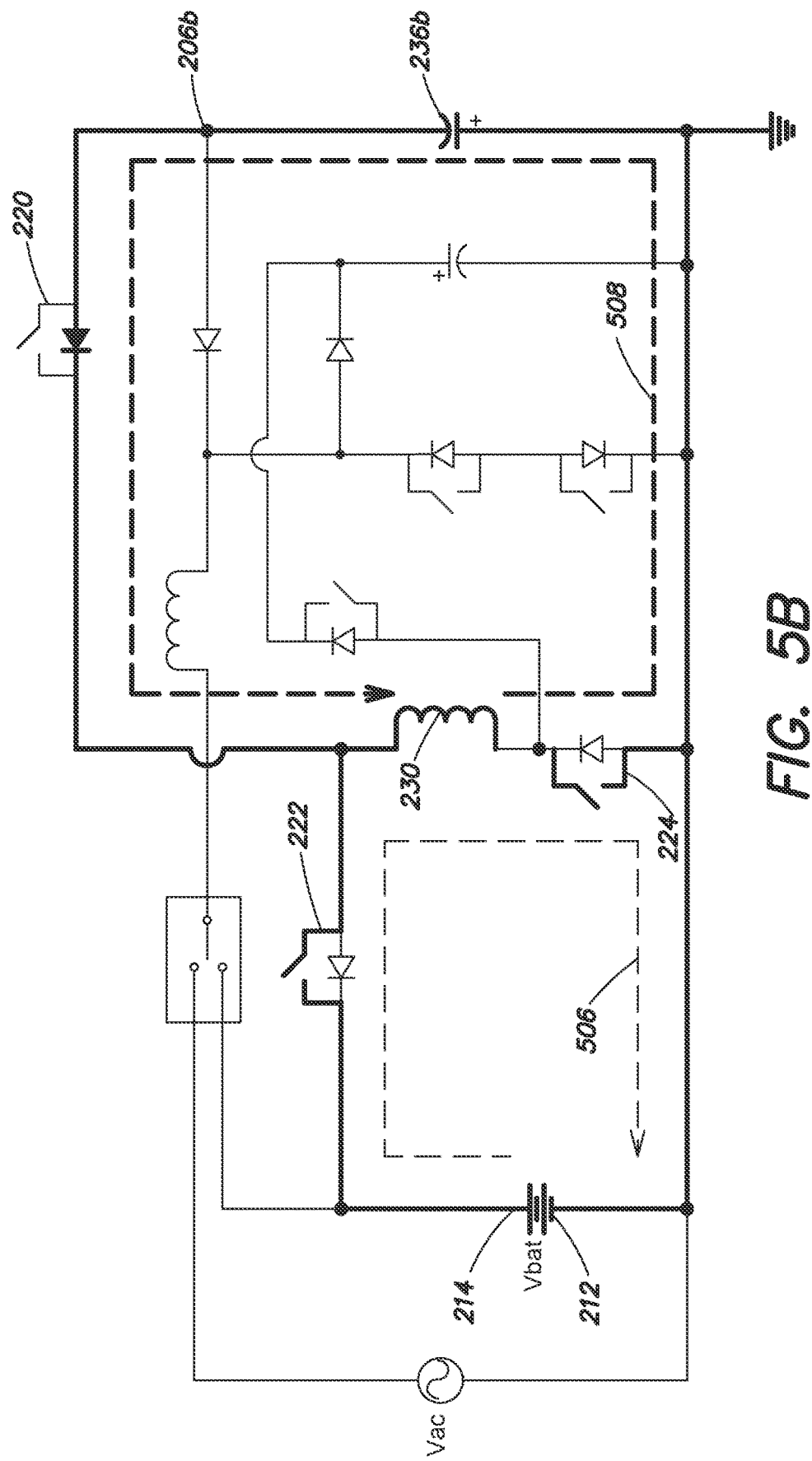

FIGS. 5A and 5B are schematic diagrams illustrating the operation of the converter 204 during the backup mode of operation of the UPS.

As shown in FIG. 5A, during the backup mode of operation and a positive DC bus cycle, the first converter switch 216 is operated to provide DC power to the positive DC bus 206a derived from the backup DC power (provided by the backup power source 212). In some examples, the first converter switch 216, the first inductor 228, and the first diode 232 are operated as a boost converter to provide DC power to the positive DC bus 206a.

In one example of the backup mode of operation during a positive DC bus cycle, the first switch 216a of the first converter switch 216 is turned on and off to provide the boost converter operation. For example, when the first switch 216a is turned on (i.e., closed), the first end of the first inductor 228 is coupled to neutral. As such, a conduction path 502 for the backup DC power is provided through the first converter switch 216, energizing the first inductor 228. In one example, the conduction path 502 includes the body diode of the second switch 216b of the first converter switch 216. Likewise, when the first switch 216a is turned off (i.e., opened), the first inductor 228 is decoupled from neutral. As such, a conduction path 504 for the backup DC power is provided through the first inductor 228 and the first diode 232 to provide DC power to the positive DC bus 206a and charge the positive DC bus capacitor 236a.

As shown in FIG. 5B, during the backup mode of operation and a negative DC bus cycle, the fourth converter switch 222 is operated to provide DC power to the negative DC bus 206b derived from the backup DC power. In some examples, the fourth converter switch 222, the second inductor 230, and the body diode of third converter switch 220 are operated as a buck-boost converter to provide DC power to the negative DC bus 206b.

In one example of the backup mode of operation during a negative DC bus cycle, the fourth converter switch 222 is turned on and off to provide the buck-boost converter operation. For example, when the fourth converter switch 222 is turned on (i.e., closed), the second end of the second inductor 230 is coupled to the backup power input 214. As such, a conduction path 506 for the backup DC power is provided through the fourth converter switch 222, energizing the second inductor 230. In one example, the conduction path 506 includes the fifth converter switch 224, which is turned on (i.e., closed) during the negative DC bus cycle. Likewise, when the fourth converter switch 222 is turned off (i.e., opened), the second inductor 230 is decoupled from backup power input 214. As such, a conduction path 508 is provided through the body diode of the third converter switch 220, allowing the second inductor 230 to de-energize and provide DC power to the negative DC bus 206b and charge the negative DC bus capacitor 236b.

In one example, the positive DC bus cycle during the backup mode of operation corresponds to a positive half cycle of the output AC voltage. Likewise, the negative DC bus cycle during the backup mode of operation corresponds to a negative half cycle of the output AC voltage. In some examples, the output AC voltage is provided by an inverter coupled to the DC busses 206a, 206b (e.g., the inverter 108 of FIG. 1).

In certain examples, alternative control schemes can be used to provide DC power to the DC busses 206a, 206b during the backup mode of operation. For example, FIG. 6 is a schematic diagram illustrating an alternate operation of the converter 204 for a positive DC bus cycle during the backup mode of operation of the UPS.

Figure 6:
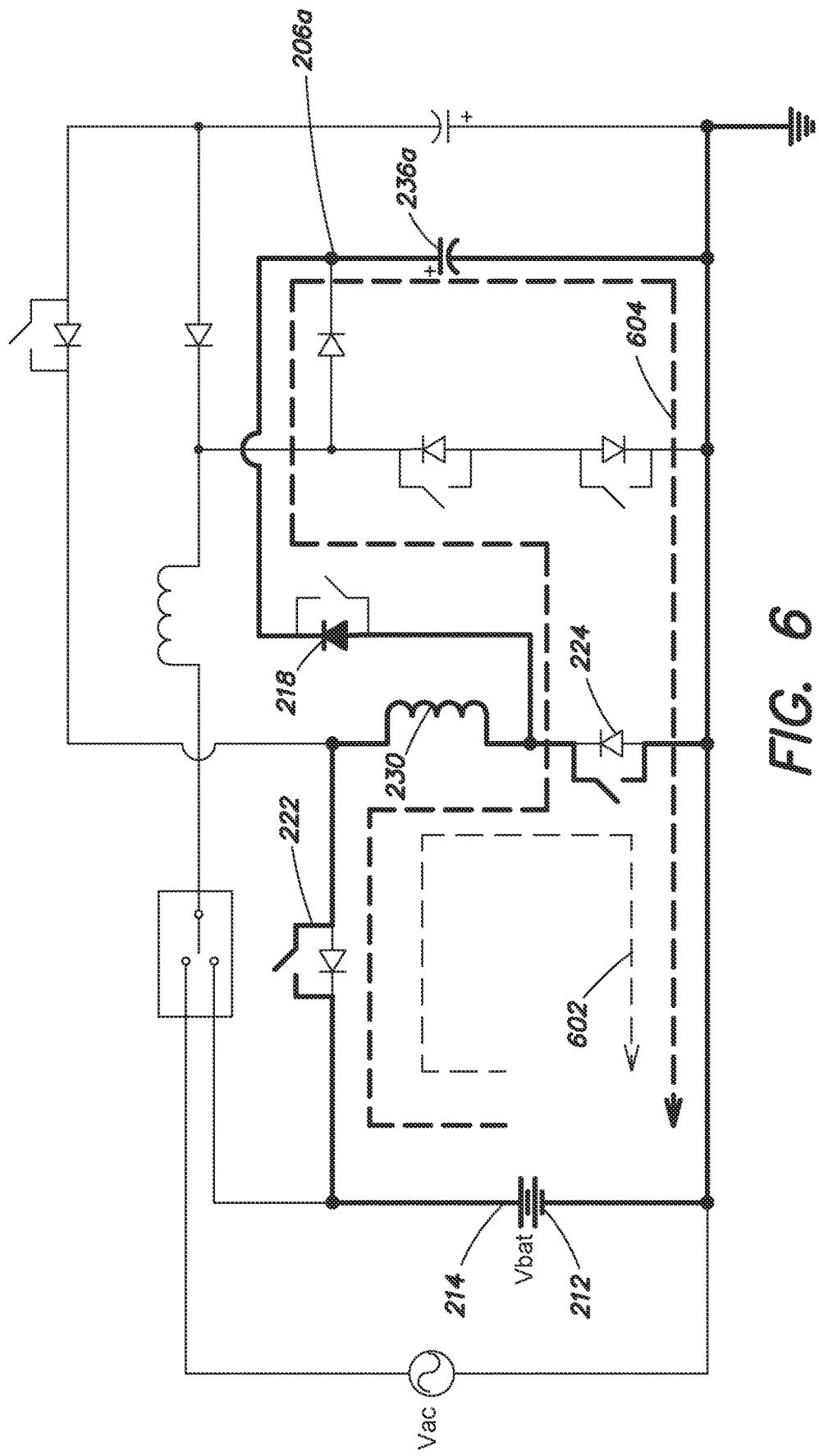
FIG. 6 is a schematic diagram of the UPS front-end topology of FIG. 2, illustrating a backup mode of operation during a positive DC bus cycle in accordance with aspects described herein.

As shown in FIG. 6, during the backup mode of operation and a positive DC bus cycle, the fifth converter switch 224 can be operated to provide DC power to the positive DC bus 206a derived from the backup DC power (provided by the backup power source 212). In some examples, the fifth converter switch 224, the second inductor 230, and the body diode of the second converter switch 218 are operated as a boost converter to provide DC power to the positive DC bus 206a.

In one example of the backup mode of operation during a positive DC bus cycle, the fifth converter switch 224 is turned on and off to provide the boost converter operation. For example, when the fifth converter switch 224 is turned on (i.e., closed), the first end of the second inductor 230 is coupled to neutral. As such, a conduction path 602 for the backup DC power is provided through the fifth converter switch 224, energizing the second inductor 230. In one example, the conduction path 602 includes the fourth converter switch 222, which is turned on (i.e., closed) during the positive DC bus cycle. Likewise, when the fifth converter switch 224 is turned off (i.e., opened), the second inductor 230 is decoupled from neutral. As such, a conduction path 604 is provided through the body diode of the second converter switch 218, allowing the second inductor 230 to de-energize and provide DC power to the positive DC bus 206a and charge the positive DC bus capacitor 236a.

In one example, the converter 204 can be configured to utilize the control scheme of FIG. 6 during a positive DC bus cycle of the backup mode of operation and the control scheme of FIG. 5B during a negative DC bus cycle of the backup mode of operation. In some examples, to support the control scheme of FIG. 6, the second inductor 230 is resized (e.g., increased) to match the full capacity of the inverter 108. Due to the resizing of the second inductor 230, the converter 204 may operate with a charging capacity up to the full capacity of the inverter 108 during the online mode of operation.

As described above, a more cost effective and compact front-end topology for an online UPS is provided herein. In at least one embodiment, the front-end topology incudes an integrated converter configured to operate as a PFC converter, a DC/DC converter, and a battery charger. In one example, the integrated converter is configured to provide power to the positive and negative DC busses while using power from the positive and negative DC busses to charge the battery. In some examples, by utilizing different components of the integrated converter to charge the battery from the DC busses while simultaneously providing power to the DC busses, a separate charger and the associated components can be eliminated from the front-end topology (and the UPS). As such, the improved front-end topology may have a reduced component count, increasing the power density of the UPS and reducing cost.

In at least one embodiment, an uninterruptible power supply is described herein that includes an input configured to receive input power from an input-power source, the input having a mains neutral connection coupled to a reference node, an energy-storage-device interface configured to be coupled to an energy-storage device to provide back-up power, the energy-storage-device interface having an energy-storage-device neutral connection coupled to the reference node, an output configured to provide output power derived from at least one of the input power and the back-up power, a power-factor-correction circuit (PFC) comprising a PFC input, a capacitor coupled to the PFC and being galvanically coupled to the energy-storage-device interface, a bidirectional converter coupled to the input and coupled to the energy-storage-device interface, and a switch coupled to the energy-storage-device interface and to the PFC input.

Having thus described several aspects of at least one embodiment of this invention, it is to be appreciated various alterations, modifications, and improvements will readily occur to those skilled in the art. Such alterations, modifications, and improvements are intended to be part of this disclosure and are intended to be within the spirit and scope of this invention. Accordingly, the foregoing description and drawings are by way of example only.

What is claimed is:

1. An uninterruptible power supply (UPS), the UPS comprising:
an input configured to receive input AC power having an input AC voltage;
a backup power input configured to be coupled to a backup power source and to provide DC power to the backup power source for charging;
a positive DC bus and a negative DC bus, the positive and negative DC busses being galvanically coupled to the backup power input; and
a converter coupled to the input, the backup power input, and the positive and negative DC busses, the converter including a first inductor, a second inductor, a first converter switch configured to couple the first inductor to a neutral connection, a second converter switch configured to couple the second inductor to the positive DC bus and provide power between the second inductor and the positive DC bus through the second converter switch, and a third converter switch configured to couple the second inductor to the negative DC bus and provide power between the second inductor and the negative DC bus through the third converter switch, wherein the UPS is voltage-frequency independent.

2. The UPS of claim 1, further comprising at least one controller coupled the converter and configured to:
operate, in a first mode of operation and during a positive half-cycle of the input AC voltage, the first converter switch to provide DC power derived from the input AC power to the positive DC bus via the first inductor and at least one of the second converter switch or the third converter switch to provide DC power derived from at least one of the positive DC bus or the negative DC bus to the backup power input via the second inductor; and
operate, in the first mode of operation and during a negative half-cycle of the input AC voltage, the first converter switch to provide DC power derived from the input AC power to the negative DC bus via the first inductor and at least one of the second converter switch or the third converter switch to provide DC power derived from at least one of the positive DC bus or the negative DC bus to the backup power input via the second inductor.

3. The UPS of claim 2, further comprising an input selection circuit configured to couple the converter to the input during the first mode of operation and to the backup power input during a second mode of operation.

4. The UPS of claim 2, wherein the at least one controller is further configured to monitor the input AC power, operate, in response to a determination that the input AC power is acceptable, the UPS in the first mode of operation, and operate, in response to a determination that the input AC power is unacceptable, the UPS in a second mode of operation.

5. The UPS of claim 2, wherein the backup power input is further configured to receive backup DC power from the backup power source and the converter further includes a fourth converter switch configured to couple the second inductor to the backup power input.

6. The UPS of claim 5, wherein the at least one controller is further configured to:
operate, in a second mode of operation, the first converter switch to provide DC power derived from the backup DC power to the positive DC bus via the first inductor; and
operate, in the second mode of operation, the fourth converter switch to provide DC power derived from the backup DC power to the negative DC bus via the second inductor.

7. The UPS of claim 5, wherein the converter further includes a fifth converter switch configured to couple the second inductor to the neutral connection and the at least one controller is further configured to:
operate, in a second mode of operation, the fifth converter switch to provide DC power derived from the backup DC power to the positive DC bus via the second inductor; and
operate, in the second mode of operation, the fourth converter switch to provide DC power derived from the backup DC power to the negative DC bus via the second inductor.

8. The UPS of claim 1, wherein the first converter switch is a bidirectional switch circuit including a first switch and a second switch coupled in series.

9. The UPS of claim 8, wherein the converter further includes a first diode coupled between the first converter switch and the positive DC bus, a second diode coupled between the first converter switch and the negative DC bus, a fourth converter switch configured to couple the second inductor to the backup power input, and a fifth converter switch configured to couple the second inductor to the neutral connection.

10. The UPS of claim 9, wherein the first inductor, the first switch of the first converter switch, a body diode of the second switch of the first converter switch, and the first diode are configured to operate as a boost converter during a positive half-cycle of the input AC voltage in the first mode of operation to provide DC power derived from the input AC power to the positive DC bus.

11. The UPS of claim 9, wherein the second inductor, the third converter switch, and a body diode of the fourth converter switch are configured to operate as a buck-boost converter in the first mode of operation to provide DC power derived from the negative DC bus to the backup power input.

12. The UPS of claim 9, wherein the first inductor, the second switch of the first converter switch, a body diode of the first switch of the first converter switch, and the second diode are configured to operate as a boost converter during a negative half-cycle of the input AC voltage in the first mode of operation to provide DC power derived from the input AC power to the negative DC bus.

13. The UPS of claim 9, wherein the second inductor, the second converter switch, and a body diode of the fifth converter switch are configured to operate as a buck converter in the first mode of operation to provide DC power derived from the positive DC bus to the backup power input.

14. The UPS of claim 9, wherein the first inductor, the first switch of the first converter switch, a body diode of the second switch of the first converter switch, and the first diode are configured to operate as a boost converter in a second mode of operation to provide DC power derived from a backup DC power to the positive DC bus.

15. The UPS of claim 9, wherein the second inductor, the fourth converter switch, a body diode of the second converter switch, and the fifth converter switch are configured to operate as a boost converter in a second mode of operation to provide DC power derived from a backup DC power to the positive DC bus.

16. The UPS of claim 9, wherein the second inductor, the fourth converter switch, a body diode of the third converter switch, and the fifth converter switch are configured to operate as a buck-boost converter during a second mode of operation to provide DC power derived from a backup DC power to the negative DC bus.

17. The UPS of claim 1, further comprising:
an output configured to provide output AC power to a load; and
an inverter coupled to the output and configured to convert DC power from the positive and negative DC busses into the output AC power and provide the output AC power to the output.

18. The UPS of claim 1, wherein the backup power input is further configured to receive backup DC power from the backup power source and the converter further includes a fourth converter switch configured to couple the second inductor to the backup power input.

19. The UPS of claim 1, wherein the first converter switch includes a bidirectional switch circuit.

20. The UPS of claim 19, wherein the bidirectional switch circuit includes a first switch and a second switch.

21. A non-transitory computer-readable medium storing thereon sequences of computer-executable instructions for controlling an uninterruptible power supply (UPS) including an input configured to receive input AC power having an input AC voltage, a backup power input configured to be coupled to a backup power source and to provide DC power to the backup power source for charging, a positive DC bus, a negative DC bus, a converter coupled to the input, the backup power input, and the positive and negative DC busses, the converter including a first inductor, a second inductor, a first converter switch configured to couple the first inductor to a neutral connection, a second converter switch configured to couple the second inductor to the positive DC bus, and a third converter switch configured to couple the second inductor to the negative DC bus, the sequences of computer-executable instructions including instructions that instruct at least one processor to:
operate, in a first mode of operation and during a positive half-cycle of the input AC voltage, the first converter switch to provide DC power derived from the input AC power to the positive DC bus via the first inductor and at least one of the second converter switch or the third converter switch to provide DC power derived from at least one of the positive DC bus or the negative DC bus to the backup power input through the second inductor; and
operate, in the first mode of operation and during a negative half-cycle of the input AC voltage, the first converter switch to provide DC power derived from the input AC power to the negative DC bus via the first inductor and at least one of the second converter switch or the third converter switch to provide DC power derived from at least one of the positive DC bus or the negative DC bus to the backup power input through the second inductor.

22. The non-transitory computer readable medium according to claim 21, wherein the sequences of instructions include instructions that cause the at least one processor to:
monitor the input AC power received at the input;
operate, in response to a determination that the input AC power is acceptable, the UPS in the first mode of operation; and
operate, in response to a determination that the input AC power is unacceptable, the UPS in a second mode of operation.

23. The non-transitory computer readable medium according to claim 22, wherein the UPS includes an input selection circuit and the sequences of instructions include instructions that cause the at least one processor to:
control the input selection circuit to couple the converter to the input during the first mode of operation; and
control the input selection circuit to couple the converter to the backup power input during the second mode of operation.

24. The non-transitory computer readable medium according to claim 22, wherein the backup power input is further configured to receive backup DC power from the backup power source and the converter includes a fourth converter switch configured to couple the second inductor to the backup power input.

25. The non-transitory computer readable medium according to claim 24, wherein the sequences of instructions include instructions that cause the at least one processor to:

operate, in the second mode of operation, the first converter switch to provide DC power derived from the backup DC power to the positive DC bus via the first inductor; and operate, in the second mode of operation, the fourth converter switch to provide DC power derived from the backup DC power to the negative DC bus via the second inductor.

26. The non-transitory computer readable medium according to claim 24, wherein the converter includes a fifth converter switch configured to couple the second inductor to the neutral connection and the sequences of instructions include instructions that cause the at least one processor to:

operate, in the second mode of operation, the fifth converter switch to provide DC power derived from the backup DC power to the positive DC bus via the second inductor; and operate, in the second mode of operation, the fourth converter switch to provide DC power derived from the backup DC power to the negative DC bus via the second inductor.

27. A method of controlling an uninterruptible power supply (UPS) including an input configured to receive input AC power having an input AC voltage, a backup power input configured to be coupled to a backup power source and to provide DC power to the backup power source for charging, a positive DC bus, a negative DC bus, a converter coupled to the input, the backup power input, and the positive and negative DC busses, the converter including a first inductor, a second inductor, a first converter switch configured to couple the first inductor to a neutral connection, a second converter switch configured to couple the second inductor to the positive DC bus, and a third converter switch configured to couple the second inductor to the negative DC bus, the method comprising:

operating, in a first mode of operation and during a positive half-cycle of the input AC voltage, the first converter switch to provide DC power derived from the input AC power to the positive DC bus via the first inductor and at least one of the second converter switch or the third converter switch to provide DC power derived from at least one of the positive DC bus or the negative DC bus to the backup power input through the second inductor; and operating, in the first mode of operation and during a negative half-cycle of the input AC voltage, the first converter switch to provide DC power derived from the input AC power to the negative DC bus via the first inductor and at least one of the second converter switch or the third converter switch to provide DC power derived from at least one of the positive DC bus or the negative DC bus to the backup power input through the second inductor.

28. An Uninterruptible Power Supply (UPS), the UPS comprising:

an input configured to receive input AC power having an input AC voltage;

a backup power input configured to be coupled to a backup power source and to provide DC power to the backup power source for charging;

a positive DC bus and a negative DC bus, the positive and negative DC busses being galvanically coupled to the backup power input; and a converter coupled to the input, the backup power input, and the positive and negative DC busses, the converter including a first inductor, a second inductor, a first converter switch configured to couple the first inductor to a neutral connection, a second converter switch configured to couple the second inductor to the positive DC bus, and a third converter switch configured to couple the second inductor to the negative DC bus, wherein the UPS is voltage-frequency independent, and wherein the first converter switch is a bidirectional switch circuit including a first switch and a second switch coupled in series.

* * * * *